Mar. 27, 1923.
E. W. McDANIEL
1,449,522
PNEUMATIC BRAKE
Filed June 1, 1921
5 sheets-sheet 3
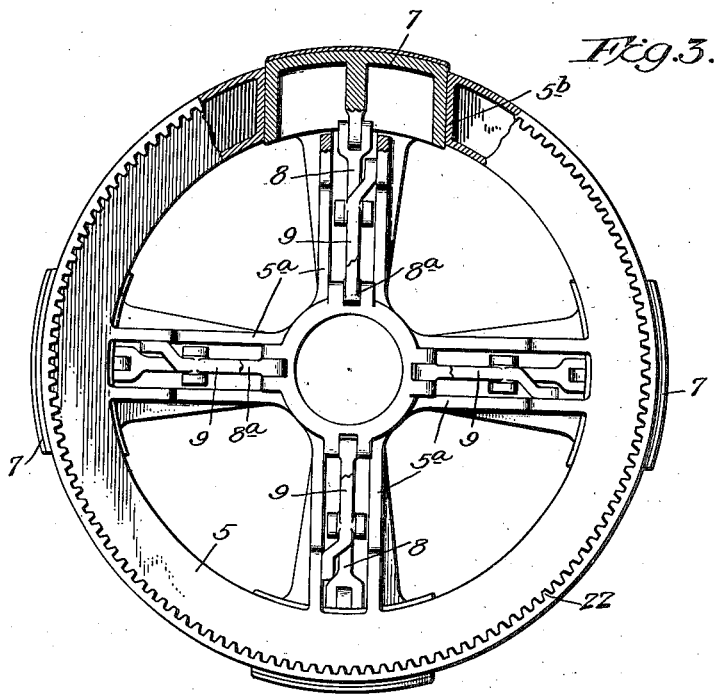
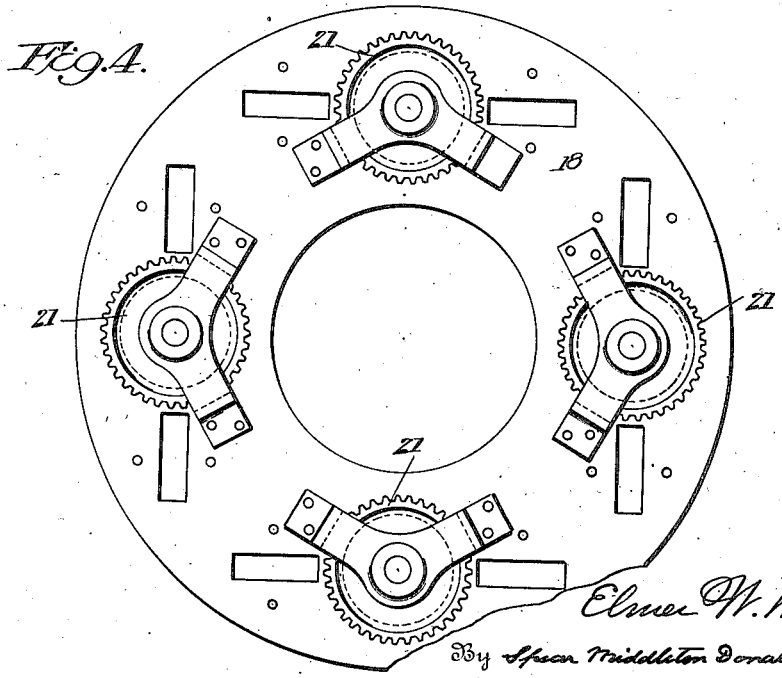
Inventor
Elmer W. McDaniel
By Spear Middleton Donaldson & Hall
Attorney

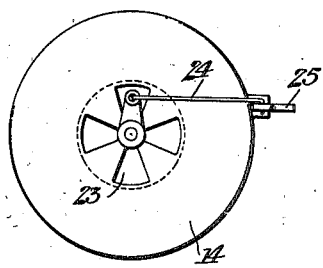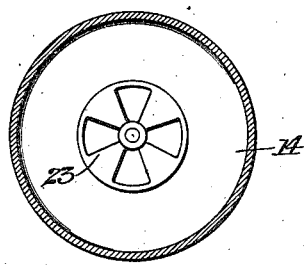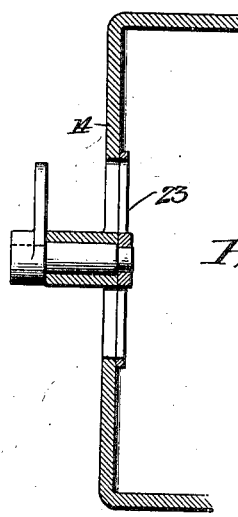

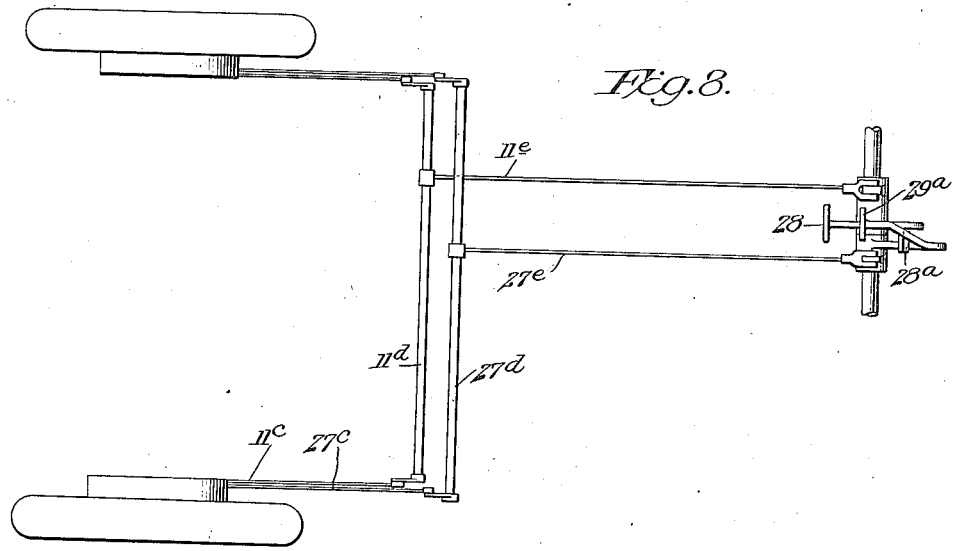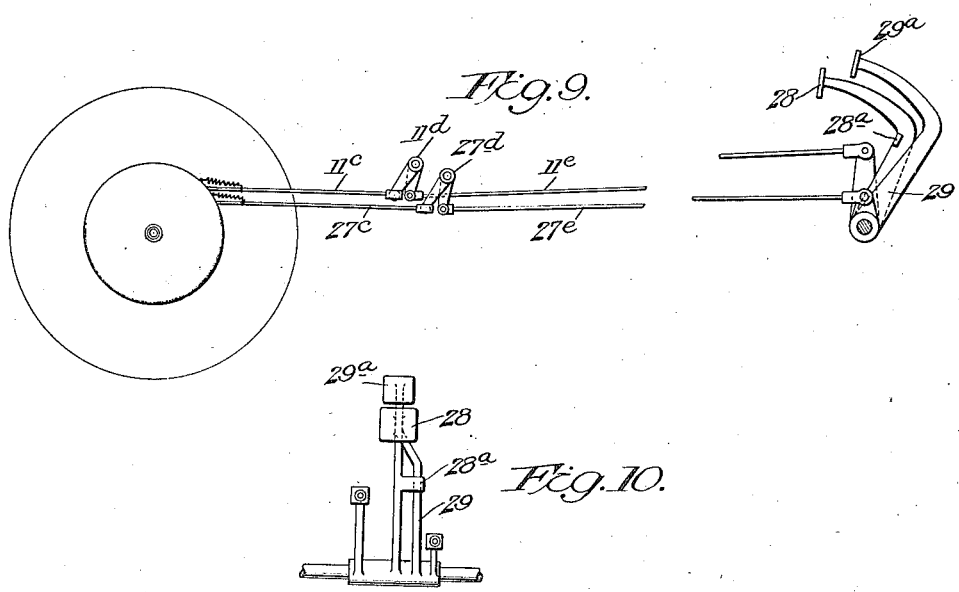

Patented Mar. 27, 1923.

1,449,522

UNITED STATES PATENT OFFICE.

ELMER W. McDANIEL, OF SAN DIEGO, CALIFORNIA.

PNEUMATIC BRAKE.

Application filed June 1, 1921. Serial No. 474,075.

*To all whom it may concern:*

Be it known that I, ELMER W. MCDANIEL, a citizen of the United States, and resident of San Diego, California, have invented certain new and useful Improvements in Pneumatic Brakes, of which the following is a specification.

My present invention relates to improvements in brakes for vehicles and is designed more especially for use in connection with automobiles, though not limited to this particular class of conveyances.

One object of the invention is to provide brake mechanism which will be operative without the employment of relatively moving friction surfaces such as brake bands and drums, thereby avoiding the heating up of the brakes and the liability of the same to rapidly burn or wear out on long or steep grades.

Another object is to provide a construction which is operable with a minimum amount of physical effort on the part of operator to produce any desired amount of braking effect up to the maximum including the locking of the wheels if necessary.

A further object is to provide a construction in which the brake action will in all cases be gradually applied, thus lessening the liability of the skidding of the vehicle.

With these and other objects in view the invention includes the novel features of construction and arrangement and combination of parts hereinafter described and particularly defined by the appended claims.

An embodyment of my invention is illustrated in the accompanying drawings in which:

Fig. 3 is a detail view partly in section and partly in elevation.

Fig. 4 is a detail view of the planetary gears and their carrier element.

Figs. 5, 6 and 7 are detail views of the valve.

Figs. 8, 9 and 10 are detail views of the controlling levers and their operating connections.

Figure 1:
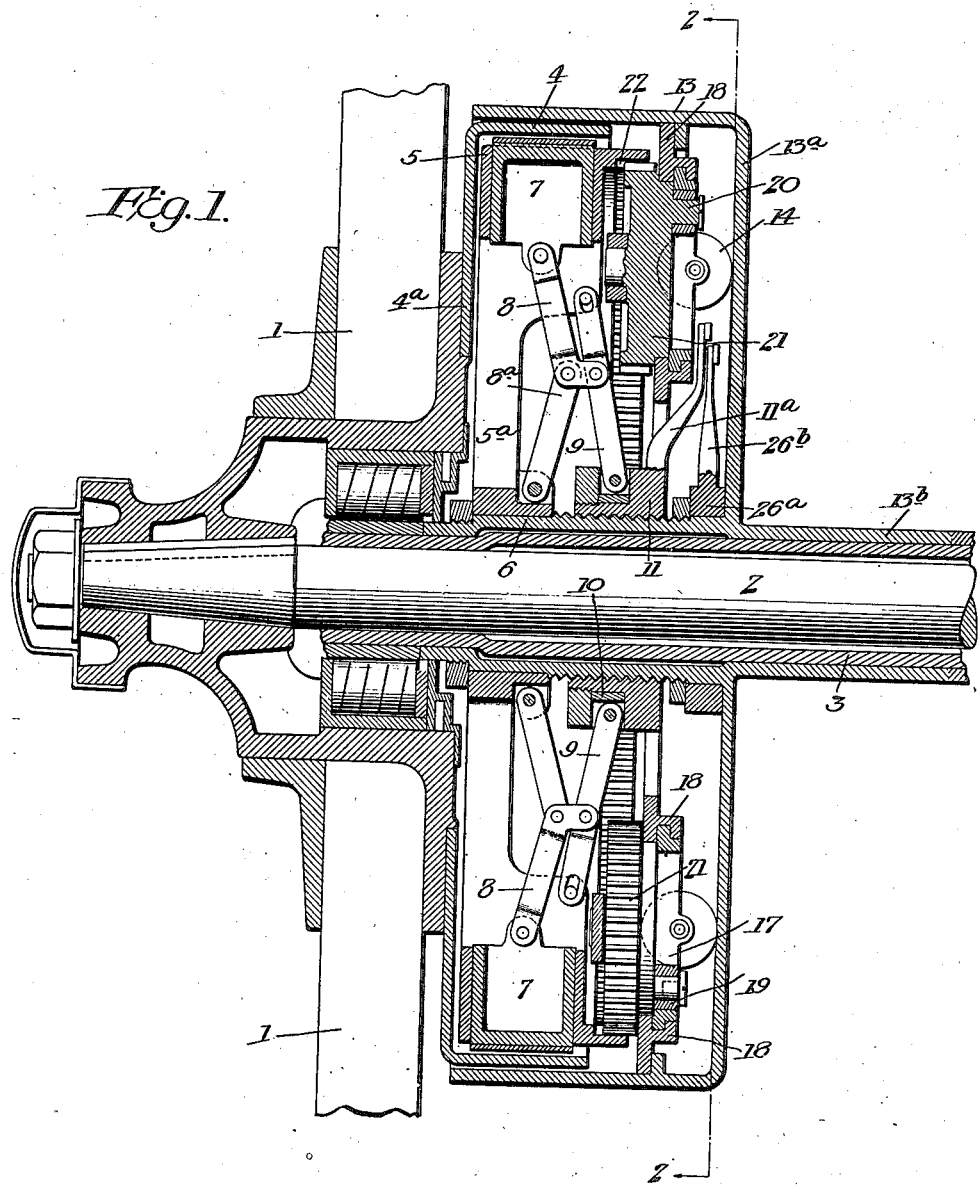
Figure 1 is a transverse vertical section through part of a wheel and axle having my improved brake mechanism applied thereto.
Figure 2:
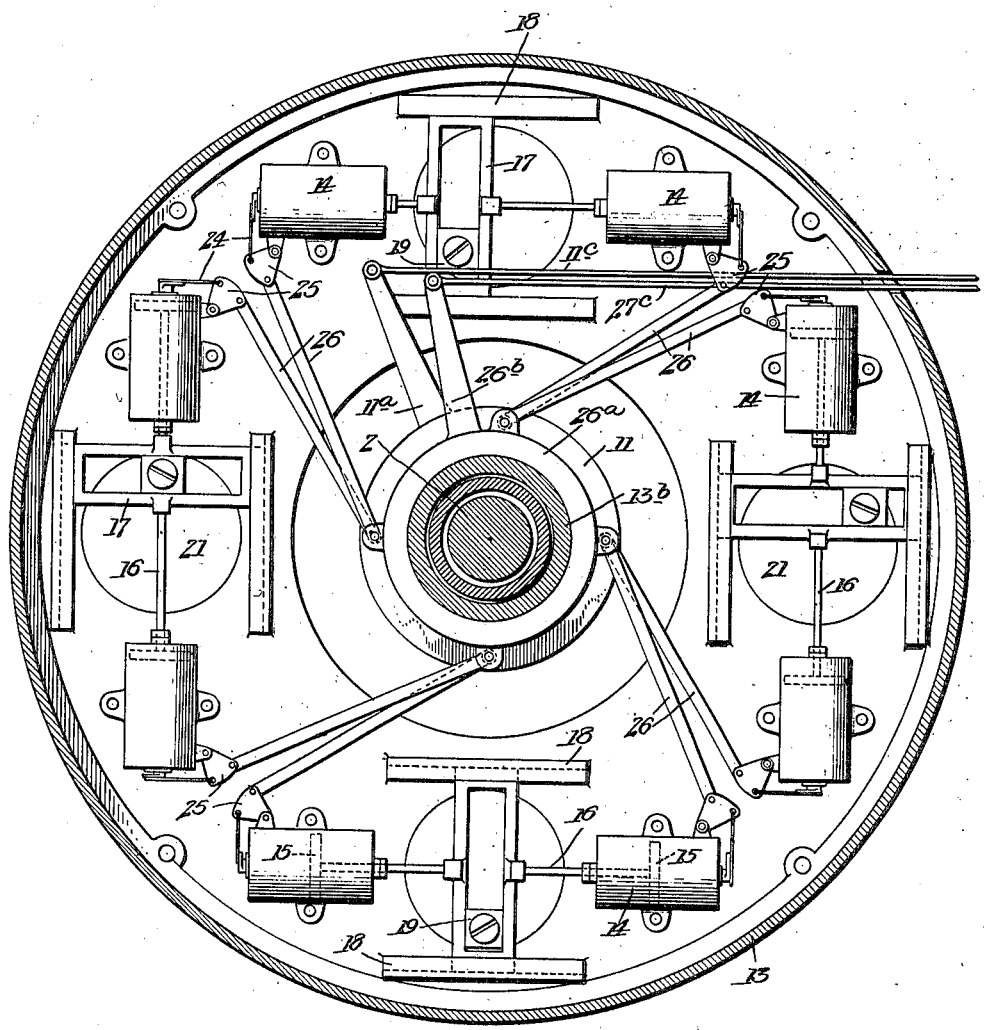
Fig. 2 is a section on line 2—2 of Fig. 1 looking towards the left.

In these drawings I have shown for convenience the driving wheel at one side of the vehicle only, and have omitted any showing of automobile frame and body as these form no part of the invention, it being understood that the brake is applicable to any type of vehicle and the mechanism would be duplicated in connection with each wheel.

Referring by reference characters to these drawings the numeral 1 designates one of the driving wheels of a motor vehicle which is shown as connected with and driven by the live axle section 2.

The wheel is shown as journaled on suitable roller bearings on a stationary axle member or housing 3 as is customary. Upon the inside of the wheel is rigidly secured an annular flange 4 which may be conveniently formed as an annular peripheral flange integral with a disc portion $4^a$ which latter may be secured to the wheel or wheel hub in any suitable manner. This annular peripheral flange may be conveniently termed a movable rotatable clutch member or drum and it encircles an inner annular rotatable but normally stationary drum or member 5, preferably annular, carried by extending spokes $5^a$, fast at their inner ends to a hub which is journaled on a sleeve 6 encircling the stationary axle or housing 3 and rigidly secured thereto. The inner drum or member 5 is provided with a plurality of guides $5^b$, four being shown as a convenient number, within which are mounted the reciprocating clutch blocks or members 7, the outer faces of which are designed to frictionally engage the inner face of the annular flange 4.

The aforesaid coacting surfaces may be provided with any suitable facing material designed to give a better grip, and it will be readily seen that when the clutch blocks are moved radially outward into engagement with the drum or member 4, the two drums 4 and 5 will be locked together and caused to rotate in unison.

It may be stated that while the parts above described resemble somewhat the customary brake drums, they do not act as a brake in the ordinary sense of the word, but simply serve as friction clutch means for causing the inner drum or member to be rotated by the wheel, and the movement of the inner member is utilized to operate air braking mechanism in the manner hereinafter described.

Associated with each block 7 is a toggle link 8, the outer end of which is pivotally connected with the block, while its inner end is connected to a second toggle link 8ª, the inner end of which latter is pivoted to the hub or inner part of member 5ª, it being understood that the toggle links are located in spaces between the spokes 5ª which is shown.

Associated with each toggle is a lever 9 which has one end connected by a fixed pivot to one of the spokes 5ª, and its other end connected to a floating ring 10 resting in a groove in a nut or wheel screw 11 which has a threaded inner periphery engaging corresponding threads on the sleeve 6. Nut or member 11 is provided with an operating arm 11ª. An intermediate portion of lever 9 is connected with the apex of the toggle and it will be readily understood that if arm 11ª is moved to rotate nut 11 in one direction the latter will be caused by the screw threads to approach wheel 1 which will tend to straighten the toggles and force all the blocks 7 outward into engagement with drum 4, while movement of the nut 11 in the opposite direction will retract the brake blocks.

Encircling the parts above described is a stationary housing 13 having a web part 13ª rigidly secured to sleeve 6, as for example by means of tubular extension 13ᵇ.

Rigidly carried by this housing is a plate or ring member 18 to which are connected a plurality of stationary air cylinders 14, preferably arranged in opposed pairs as shown. Within the cylinders of each pair are located pistons 15 which are connected by a single piston rod 16 with a cross head 17 slidably mounted in guides 18 so as to permit reciprocating movement in the direction of the piston rods. The cross-heads are constructed as guides for blocks 19, which blocks can move in the guides perpendicular to the piston rods. The blocks are eccentrically connected by pins 20 with gear wheels 21 journaled in stationary bearings, which gears mesh with an internal annular rack or gear 22 fast on or connected to member 5. Thus when the drum 5 is locked to movable drum 4, as above described, the gears will be rotated and will, through the cross heads and piston rods, reciprocate the pistons. These latter are made as ordinary pump plungers, compressing air on the inward stroke, but allowing air to pass through into the pistons on the outward stroke.

It will be readily observed that by providing the cylinders with relief valves capable of being opened more or less, or completely closed at will of the operator, I may impart any degree of resistance to the movement of the vehicle desired, even to the locking of the wheels by the complete closing of the valves, although due to the slight amount of time necessary for accumulation of sufficient air pressure or resistance, such locking of the wheels will be done with a gradual or cushion effect.

The air relief valves are indicated at 23 and are connected by rods 24, bell cranks 25, and rods 26, with a floating ring 26ª mounted on sleeve 13ᵇ and having an operating arm 26ᵇ. Projections 11ª and 26ᵇ are connected to suitable operating means by brake rod connections of the customary type, such as rods at 11ᶜ and 27ᶜ, rock shafts 11ᵈ and 27ᵈ, and rods 11ᵉ and 27ᵉ, and in my preferred embodiment, as illustrated in the drawings, such operating means takes the form of a foot pedal 28 connected by rods as aforesaid to the ring 11, and an associated pedal 29 connected to air relief valve controlling ring 26ª (see Figs. 8 and 9).

Pedal lever 28 is provided with a lug 28ª which overlies lever 29 so that air relief valve control lever 29 is automatically carried forward by pressure on foot pedal lever 28.

The relative adjustment is such that the friction of the clutch blocks as they come into action is always in advance so to speak or excess of the resistance due to the air compression, so as to prevent the slippage of the blocks or clutches.

For ordinary purposes, the operation of foot pedal 28 will secure all necessary degrees of braking effect without locking the wheels, but if the latter is desired for emergency purposes, the valves may be completely closed by rocking the foot and causing the toe to depress extension 29ª thus advancing lever 29 further than it would be carried by pedal 28.

From the foregoing it will be seen that I provide brake mechanism which will not wear out due to the rubbing of friction surfaces, which will not overheat or burn out in descending long grades, and in which all tendency to "grab" is avoided, thereby lessening the liability of skidding.

Having thus described my invention, what I claim is:

1. In a brake for wheeled vehicles, a normally stationary annular rack, a stationary member adjacent the rack having planetary gears meshing with said rack, air compressing means carried by said annular member and arranged to be operated by said gears, and clutch mechanism for connecting said normally stationary member to a wheel of the vehicle, 2. In a brake for wheeled vehicles, a drum fast on the wheel, a normally stationary member within the drum, radially movable clutch shoes carried by said member, and arranged to coact with said drum, means for operating said shoes, a fixed annular member adjacent said normally stationary member, and air pump mechanism carried by said fixed annular member connected to be operated by said normally stationary member.

3. In a brake for wheeled vehicles, an annular member fast on the vehicle wheel, a normally stationary member associated therewith, friction clutch mechanism designed to connect said members, air pump means constructed and arranged to be operated by said normally stationary member, air relief valve means for said pump means, a lever for operating said friction clutch mechanism, and a lever for operating said air relief means, said levers being arranged adjacent each other and said first named lever having a projection overlying said second named lever.

4. In a brake for wheeled vehicles, a friction clutch member carried by a vehicle wheel, a normally stationary rotary member, a movable clutch member carried by said rotary member, air pump mechanism arranged to be operated by said rotary member, toggle mechanism for operating said movable clutch member, means for operating said toggle mechanism, air relief valve means for said air pump mechanism, and means for operating said valve means.

5. In a brake for wheeled vehicles, the combination with a wheel and axle, of an annular clutch member fast on said wheel, a stationary sleeve encircling the axle, a member mounted to have rotatable movement about said sleeve, a clutch shoe slidably carried by said rotatable member, a nut threaded on said sleeve, means for operating said nut, means whereby movement of said nut operates said clutch shoe, and air pump mechanism connected to be operated by said rotatable member.

6. In a brake for wheeled vehicles, the combination with a wheel and axle, of an annular clutch member fast on said wheel, a stationary sleeve encircling the axle, a member mounted to have rotatable movement about said sleeve, a clutch shoe slidably carried by said rotatable member, a nut threaded on said sleeve, means for operating said nut, means whereby movement of said nut operates said clutch shoe, a stationary housing surrounding said clutch member, air pump means supported by said housing, and means whereby the rotation of said rotary member operates said air pump mechanism.

7. In a brake for wheeled vehicles, the combination with a wheel and axle, of an annular clutch member fast on said wheel, a stationary sleeve encircling the axle, a member mounted to have rotatable movement about said sleeve, a clutch shoe slidably carried by said rotatable member, a nut threaded on said sleeve, means for operating said nut, said nut having an annular groove, a floating ring in said groove, toggle mechanism for operating said clutch shoe, a lever interposed between said floating ring and toggle for operating the latter, and air pump mechanism arranged to be operated by said movable member.

8. In a brake for wheeled vehicles, air pump mechanism carried by a fixed part of the vehicle, operating mechanism for said air pump means, friction clutch mechanism designed to connect said operating mechanism with a wheel of the vehicle, air relief valve means for said pump means, a lever for operating said friction clutch mechanism, and a layer for operating said air relief means, said levers being arranged adjacent each other and said first named lever having a projection overlying said second named lever.

9. In a brake for wheeled vehicles, a friction clutch member carried by a vehicle wheel, a normally stationary rotary member, a coacting movable clutch member carried by said second member, an annular rack also carried by said second member supported from a stationary part of the vehicle, planetary gears meshing with said rack and arranged to operate said air pump mechanism, and means for operating said clutch member.

10. In a vehicle brake, a stationary element carried by a fixed part of the vehicle, an air pump carried thereby having a reciprocating piston, a gear journaled on a stationary axis and having a connection for operating said piston, a normally stationary annular rack meshing with said gear, and means for driving said rack from the vehicle axle.

11. In a vehicle brake, a stationary element carried by a fixed part of the vehicle, a pair of opposed air pumps supported thereby and having connected pistons, a gear journaled on a fixed axis and having an eccentric pin connected to operate said pistons, a normally stationary annular rack meshing with said gear, and means for connecting said annular rack with a wheel of the vehicle.

12. In a vehicle brake the combination with a stationary axle housing and live axle therein, and a wheel fast on said axle, of an annular flange on said wheel, an annular normally stationary member carried by said axle housing and capable of rotation thereon, said annular member lying within said annular flange and having a projecting annular rack with internal teeth, radially movable clutch shoes carried by said annular member, with means for operating them, an annular fixed member supported by said axle housing, air pump mechanism carried by said fixed member, and gearing for operating said air pump mechanism from said rack.

13. In a vehicle brake the combination with a stationary axle housing and live axle therein, and a wheel fast on said axle, of an annular flange on said wheel, an annular normally stationary member carried by said axle housing and capable of rotation thereon, said annular member lying within said annular flange and having a projecting annular rack with internal teeth, radially movable clutch shoes carried by said annular member, with means for operating them, an annular fixed member supported by said axle housing, air pump mechanism carried by said fixed member, gearing for operating said air pump mechanism from said rack, and a stationary housing enclosing said parts and overlying the flange on the wheel.

14. In a vehicle brake the combination with a stationary axle housing and live axle therein, and a wheel fast on said axle, of an annular flange on said wheel, an annular normally stationary member carried by said axle housing and capable of rotation thereon, said annular member lying within said annular flange and having a projecting annular rack with internal teeth, radially movable clutch shoes carried by said annular member, with means for operating them, an annular fixed member supported by said axle housing, a plurality of gears journaled on one face of said fixed member and meshing with said rack, a plurality of air pumps carried by the other face of said fixed member, and means whereby said gears operate said pumps.

15. In a vehicle brake a plurality of air pumps annularly disposed about the axle adjacent the wheel, means for causing said pumps to be operated from said wheel, and a casing enclosing said pumps and operating connections.

16. In a vehicle brake the combination with a wheel having an annular flange, of an annular casing overlapping said flange and forming therewith a completely enclosed chamber, air pump mechanism within said chamber, and clutch mechanism within said chamber for controlling the action of said pump mechanism.

17. In a vehicle brake the combination with a wheel and axle, of a stationary sleeve about the axle, an annular member mounted to be capable of rotary movement about said sleeve, means for clutching said member to the wheel, a fixed annular member encircling said sleeve, an annular rack on said first named annular member, a plurality of gears rotatably carried by said fixed member and meshing with said rack, a plurality of annularly arranged pump cylinders carried by said fixed members and having pistons connected to be operated by said gears, said cylinders having air escape valves, a ring rotatable about said sleeve, connections from said ring to said valves for operating the latter, and means for oscillating said ring.

In testimony whereof I affix my signature.

ELMER W. McDANIEL.